United States Patent [19]

Cox

[11] 4,120,482

[45] Oct. 17, 1978

[54] FLUID SEAL

[76] Inventor: Derek Michael Cox, 76 Irvine Rd., Kilmarnock, Ayrshire, Scotland

[21] Appl. No.: 807,095

[22] Filed: Jun. 16, 1977

[51] Int. Cl.² .................................. F16K 1/226
[52] U.S. Cl. ............................ 251/306; 251/173; 277/170
[58] Field of Search .................. 277/168–170, 277/227, 95; 251/306, 307, 173, 172, 171, 170

[56] References Cited

U.S. PATENT DOCUMENTS

| 3,156,445 | 11/1964 | Swain | 251/307 X |
| 3,399,863 | 9/1968 | Fawkes | 251/306 |
| 3,409,269 | 11/1968 | Fawkes | 251/306 X |
| 3,612,483 | 10/1971 | Pool | 251/306 |
| 3,650,508 | 3/1972 | Kosmala et al. | 251/173 X |
| 3,734,457 | 5/1973 | Roos | 251/173 |
| 3,771,763 | 11/1973 | Myers | 251/173 |

FOREIGN PATENT DOCUMENTS

| 583,610 | 9/1933 | Fed. Rep. of Germany | 251/306 |
| 995,934 | 6/1965 | United Kingdom | 277/95 |
| 1,305,554 | 2/1973 | United Kingdom | 251/306 |

Primary Examiner—Robert S. Ward, Jr.
Attorney, Agent, or Firm—Edward H. Mazer; George S. Schwind

[57] ABSTRACT

A valve for controlling fluid flow comprising a valve casing having a passage therethrough, an obturator disposed in the passage, and a stem extending through the casing into the passage, said stem secured to the obturator for pivotal movement therewith. A sealing strip is disposed in a groove in the passage, the sealing strip including: a sealing face for compressing, fluid-tight engagement with the obturator, a pair of oppositely disposed, spaced-apart side faces, each side face having a slot therein, each slot overlapping the other slot without interfering with the other slot, and a base extending between said side faces, the width of said base being greater than the width of either of the slots. Rotation of the obturator to block fluid flow through the passage forces the obturator into compressing engagement with the sealing face and distorts the slots.

6 Claims, 3 Drawing Figures

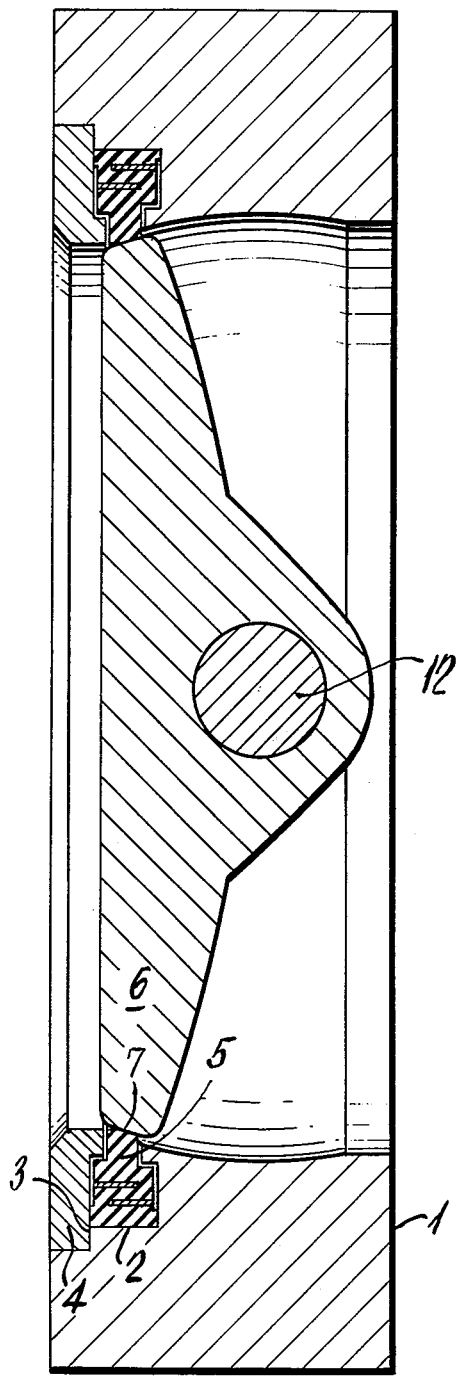
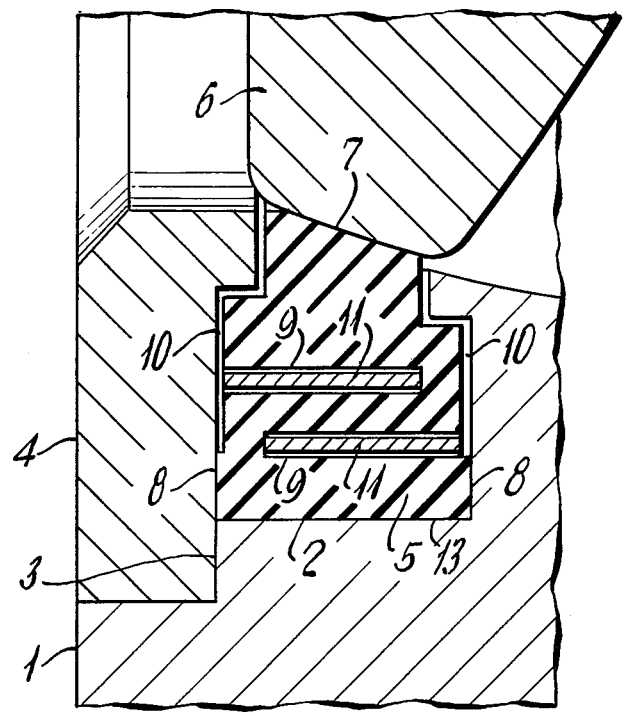
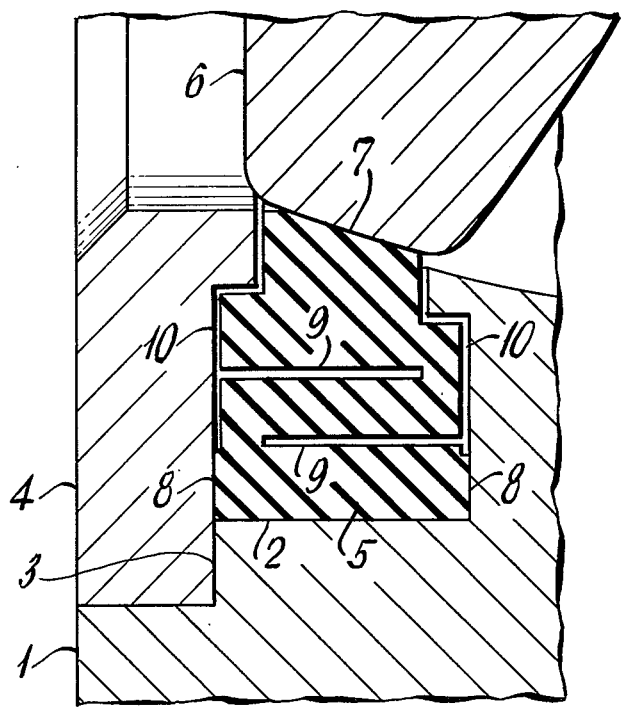

FLUID SEAL

BACKGROUND OF THIS INVENTION

The subject of this invention is a fluid seal particularly for use in situations where the seal is to be broken and remade repeatedly, for example for providing a seal around the obturator member of a butterfly or other type valve when the obturator has been rotated into the closed position, transverse to the axis of the fluid passage through the valve.

The normal type of seal particularly as used in butterfly and gate valves consists of a plain strip of resilient material such as natural or artificial rubber. Such a sealing strip by its own resilience can deform sufficiently within its own bulk, i.e., by changing its cross-sectional shape to provide an excellent seal. A seal of material as soft as rubber is, however, unsuitable in certain situations simply by reason of the softness and high resiliency of the material. For example, where the seal is to resist high pressures the material of the seal must be comparatively hard to avoid extrusion of the seal. In such situations it is customary to use certain synthetic materials, one suitable material being a fluorocarbon resin such as polytetrafluoroethylene. This material is, however, incapable of deforming sufficiently under the valve closure force normally available to provide the required sealing characteristics so that special and expensive precision machining of the obturator and the sealing strip are necessary to obtain a good seal.

It is an object of the present invention to provide a fluid seal which is capable of providing a good seal even when formed of comparatively rigid material.

DESCRIPTION OF THE PRESENT INVENTION

A fluid seal according to the invention comprises a strip of sealing material having a sealing face formed to receive the sealing face of a rigid object with which the seal is to be made of two side faces, one on each side of the sealing face, each formed with at least one slot, the width of the two side faces and their location being chosen so that the slots are spaced apart, the slots overlapping one another within the strip without interfering with one another.

The slots are preferably short in relation to their width. Deformation-limiting means cooperating with the sealing strip may be disposed in the slots to limit deformation of the sealing strip. In the embodiment shown deformation-limiting plates of rigid material each of a thickness less than the height of the slot containing it are disposed in each slot.

At least one side face of the sealing strip may be partially recessed to provide room for some lateral distortion when the strip is confined within a groove.

The portion of at least one side face terminating adjacent the sealing strip may be checked to present a shoulder.

The sealing strip may be formed as an endless sealing ring the sealing face being an internal or external peripheral face and the slots in the side faces being endless slots. Where the slots contain deformation-limiting plates, these plates are formed as bands which may be continuous or may be split. Where the body to be sealed is to meet the sealing strip in an oblique direction the sealing face may be inclined with respect to the side faces, i.e., the sealing face makes an angle greater than 90° with one side face and less than 90° with the other side face.

The invention also consists of the combination of a fluid-control valve incorporating a pivotable obturator, a stem passing through the casing into the passage for rotatably moving the obturator casing into the passage, and a fluid seal comprising a sealing strip as described formed as a ring the sealing face of the sealing strip being engageable by a peripheral portion of the obturator.

Where the valve is a butterfly valve having a swingable obturator located within a casing the casing is formed with an annular groove surrounding the fluid passage through the casing at a position where the edge face of the obturator would otherwise come against the interior of the casing in the valve-closed position, said groove containing a sealing strip is described formed as a ring.

In one construction one end of the valve casing is formed with an annular notch surrounding the fluid passage through the casing, a sealing strip formed as a ring resting in the notch and being retained therein when the notched end of the casing is fitted against the face surrounding the passageway the effective area of which is to be controlled by the valve, e.g., the flange on a pipe to which the valve is to be connected. Alternatively a retaining ring may be fitted against or juxtaposed with the notched end of the casing to retain the sealing strip. The groove may be a straight-sided groove or may be formed with overhung shoulders engageable with shoulders formed on the sealing strip as described. Alternatively, the groove may be of dovetail shape, the width of the bottom being greater than the width at the top, the sealing strip being also dovetail shaped in cross section with the smallest width adjacent the sealing face.

Alternatively, the sealing strip in the shape of a ring may be accommodated in the obturator.

The deformation-limiting plate in the shape of an annular band may be of a deformable material which can be prestressed and each band may then be formed originally of a diameter smaller than the diameter of the slot it is to fit, being then elastically expanded before being inserted in its slot so that it exerts a circumferential compressive stress on the annular sealing strip, tending to cause it to contract in diameter.

Where the valve is a gate valve at least one of the flat valve faces engageable by the gate is formed with a groove surrounding the passage through the valve body and a sealing strip in the form of an endless ring may be retained in position in the flat valve face by use of a junk ring Practical embodiments of the invention are illustrated in the accompanying drawings in which FIG. 1 is a longitudinal section of butterfly valve fitted with a sealing ring of the invention and FIGS. 2 and 3 are larger scale diagrams showing two forms of sealing rings in cross section, FIG. 2 illustrating a sealing ring having plates relatively rigid material disposed in each of the slots, and FIG. 3 illustrating a sealing ring without plates in the slots.

In the drawings, 1 denotes the casing of a butterfly valve formed at one end with an annular notch 2, and having a shoulder 3 adjacent to the notch. A retaining ring 4 removably secured to the shoulder forms with the notch 2 an annular groove in the casing 1, said groove containing a sealing strip 5 in the form of a closed, i.e., an endless ring against which a rotatable obturator 6 forming the control part of the butterfly valve is engageable. The obturator is secured to stem 12, the stem extending through the casing to a handle or operator (not shown) in the usual manner. Reference numeral 7 denotes a sealing face on the inner periphery of the annular sealing strip, 8 denotes spaced-apart side faces of the sealing strip one on each side of the sealing face 7 and 13 denotes the base extending between the side faces. In the illustrated construction the sealing face 7 is obliquely inclined with respect to the side faces 8. Slots 9 are formed in the side faces 8 said slots being wide in comparison with their height, their width and positions being chosen so that the slots overlap one another without interfering with one another, the width of the base being greater than the width of either of the slots. A portion of the side faces 8 are recessed at 10 to provide room for some lateral distortion of the strip 5. In the construction of FIG. 2 the slots contain flat plates 11 of rigid material, each plate having a thickness less than the height of the slot within which the plate is contained. The plates may be formed as open or closed bands. The shoulder 3 and the shoulder on the retaining ring 4 serve to retain the strip 5 in the groove in the casing. FIG. 3 is similar to the embodiment of FIG. 2 but does not have flat plates within the slots.

In practice, when the obturator 6 of a butterfly valve is rotated transverse to the axis of the passage by stem 12, the obturator comes against the sealing face 7 of the strip 5 in ring shape it applies a thrust against the sealing face of the strip and causes the ring to compress radially. Even where the ring is made of a material which is not particularly deformable and which would not be expected to deform sufficiently by an outwardly directed radial thrust sufficient distortion is provided to form a good seal by movement of the portion of the strip to one side of each slot 9 towards the portion of the ring on the other side of the slot, the material at the root of the slots bending to suit and the slots becoming narrower. Thus the effect of flexibility is provided in a comparatively inflexible sealing material particularly as irregularities in the circularity of the obturator of a butterfly valve and also in the flatness of a gate valve are usually gradual irregularities and extend over a sufficient length of the strip, i.e., the circumference of the ring to cause the resultant varying amount of flexure at the root of each slot 9 to be within the flexing capabilities of the comparatively hard material of the ring thus permitting the ring to seal properly despite irregularities in the obturator. In the particular construction of FIG. 2 deformation of the ring is limited to the amount by which the deformation-limiting plates 11 are thinner than the height of the slots 9. This construction makes possible control of the maximum deformation of the sealing strip in situations where for practical reasons of manufacture may require the slots 9 to be made higher than the maximum allowable distortion of the strip.

A deformation-limiting plate such as a plate 11 formed into a closed, i.e., an endless annular band and radially expanded before fitting to a sealing strip in the form of a ring is effective to urge the annular sealing strip to contract into engagement with the object to be sealed thus causing the sealing strip to conform closely with the shape of the peripheral contour of the object agaist which the seal is to be made thus enhancing the sealing effect.

Much the same effect occurs when the deformation-limiting plate is in the form of a band which is not prestressed because when the sealing load is applied and the ring is expanded the deformation-limiting band is then put into a state of circumferential tensile stress which influences the amount of expansion of the sealing ring. However, prestressing of the deformation-limiting band can in some cases allow the sealing ring to take a higher sealing load than it would otherwise resist because then the prestressed deformation-limiting band puts the sealing ring in an initial state of negative circumferential tensile stress.

The sealing action of the sealing strip may in some cases be assisted by entry of fluid under pressure into one or each groove, the pressure of the fluid then resisting radial deformation of the ring.

I claim:

1. A valve for controlling fluid flow comprising:
    a. a valve casing having a fluid passage therethrough, one end of said casing having an annular notch adjacent the pasage and, a shoulder adapted to receive a retaining ring;
    b. a retaining ring removably secured to said shoulder, said ring and notch defining a groove adapted to receive a sealing strip;
    c. a sealing strip, said strip positioned in the groove and adapted to be compressed by an obturator, said strip including: a sealing face adapted to cooperate with an obturator; a pair of oppositely disposed spaced-apart side faces extending from said sealing face, each of said side faces having a slot therein distortable when said sealing strip is compressed by said obturtor, each slot overlapping the other slot without interfering with the other slot; and a base extending between said side faces, the width of said base being greater than the width of either of the slots;
    d. a deformation-limiting means disposed in each slot, said means cooperating with said sealing strip to limit deformation of said strip;
    e. a stem rotatably disposed in said passage and extending through said casing; and,
    f. an obturator secured to said stem for movement therewith, said obturator compressingly engaging said sealing strip to regulate fluid flow through the passage.

2. The valve of claim 1 wherein said means comprises a plate disposed in each of the slots said plates cooperating with said sealing strip to limit strip deformation.

3. The valve of claim 2 wherein the height of each of said plates is less than the height of its respective slot.

4. The valve of claim 3 wherein each of said plates is substantially annular.

5. The valve of claim 4 wherein a portion of each of the side faces is recessed to thereby permit lateral distortion of said strip in the groove.

6. The valve of claim 1 wherein the sealing face is obliquely inclined with respect to the side face.

* * * * *